United States Patent
Zeng et al.

(10) Patent No.: US 12,379,261 B1
(45) Date of Patent: Aug. 5, 2025

(54) TEMPERATURE MEASUREMENT CIRCUIT STRUCTURE AND TEMPERATURE PROBE

(71) Applicant: Shenzhen TOPOS Sensor Technology Co., LTD., Shenzhen (CN)

(72) Inventors: Zhaoting Zeng, Shenzhen (CN); Jinkun He, Shenzhen (CN)

(73) Assignee: Shenzhen TOPOS Sensor Technology Co., LTD., Shenzhen (CN)

( * ) Notice: Subject to any disclaimer, the term of this patent is extended or adjusted under 35 U.S.C. 154(b) by 0 days.

(21) Appl. No.: 19/023,710

(22) Filed: Jan. 16, 2025

(30) Foreign Application Priority Data

Jan. 9, 2025 (CN) .......................... 202520051906.X

(51) Int. Cl.
*G01K 7/22* (2006.01)
*G01K 1/024* (2021.01)
*G01K 1/08* (2021.01)
*G01K 7/02* (2021.01)
G01K 7/16 (2006.01)

(52) U.S. Cl.
CPC ................. *G01K 7/22* (2013.01); *G01K 1/08* (2013.01); *G01K 7/02* (2013.01); *G01K 1/024* (2013.01); *G01K 7/021* (2013.01); *G01K 2007/163* (2013.01)

(58) Field of Classification Search
CPC .. G01K 7/22; G01K 1/08; G01K 7/02; G01K 1/024; G01K 7/021; G01K 2007/163
See application file for complete search history.

(56) References Cited

U.S. PATENT DOCUMENTS

| | | | | |
|---|---|---|---|---|
| 4,201,088 | A * | 5/1980 | Trietley, Jr. .............. | G01K 3/08 374/E3.006 |
| 7,059,769 | B1 * | 6/2006 | Potega .................... | B60L 58/25 374/185 |
| 2010/0326185 | A1 * | 12/2010 | Shimada ................ | G01K 7/206 73/204.27 |
| 2019/0339133 | A1 * | 11/2019 | Pulvermacher ........ | G01K 1/022 |
| 2022/0049992 | A1 * | 2/2022 | Nivala ................... | G01K 1/024 |
| 2022/0209548 | A1 * | 6/2022 | Chen .................. | H02J 7/007182 |
| 2022/0287568 | A1 * | 9/2022 | Geissler ................. | G16H 50/20 |
| 2022/0333997 | A1 * | 10/2022 | Newhouse .............. | G01K 1/12 |
| 2022/0381621 | A1 * | 12/2022 | Huang ................... | G01K 7/021 |
| 2023/0042691 | A1 * | 2/2023 | Yu ......................... | H01M 10/44 |

(Continued)

*Primary Examiner* — Laura Martin
*Assistant Examiner* — Philip L Cotey
(74) *Attorney, Agent, or Firm* — JEEN IP LAW, LLC

(57) ABSTRACT

A temperature measurement circuit structure and a temperature probe are provided. The temperature measurement circuit structure includes a first temperature measurement circuit, a second temperature measurement circuit, a charging module, and a switching circuit, the switching circuit is connected to the charging module; a third wire and a fourth wire of the second temperature measurement circuit are connected to a control chip through a PCBA board; a first charging wire of the charging module is connected to the control chip through the PCBA board; in a charging state, the switching circuit connects the third or fourth wire to the charging module and serves as a second charging wire of the charging module; in a non-charging state, the switching circuit disconnects the third or fourth wire, which serves as the second charging wire, from the charging module. By switching the circuit, one wire inside a handle was reduced.

11 Claims, 3 Drawing Sheets

(56) References Cited

U.S. PATENT DOCUMENTS

| | | | | |
|---|---|---|---|---|
| 2024/0175761 A1* | 5/2024 | Cheng | .................... | G01K 1/026 |
| 2024/0310215 A1* | 9/2024 | Wang | ..................... | G01K 1/024 |
| 2024/0353266 A1* | 10/2024 | Nivala | ................... | G01K 1/024 |

* cited by examiner

TEMPERATURE MEASUREMENT CIRCUIT STRUCTURE AND TEMPERATURE PROBE

CROSS-REFERENCE TO RELATED APPLICATIONS

This application claims priority to Chinese Patent Application No. 202520051906.X, filed on Jan. 9, 2025, which is hereby incorporated by reference in its entirety.

TECHNICAL FIELD

The present disclosure relates to the field of temperature measurement circuit structure and temperature probe technologies, and in particular, to a temperature measurement circuit structure and a temperature probe.

BACKGROUND

The continuous simplification and optimization of internal structures of temperature probes, especially those used for food, is an important development direction in the field of temperature probe devices. A more streamlined internal structure can provide greater physical space for the design of internal structures of temperature probes and further reduce the production cost of products.

In the existing technology, food temperature probes usually include a probe housing component, and a temperature measurement circuit set inside the probe housing component. The probe housing component usually includes a probe body and a handle. The temperature measurement circuit includes a first temperature measurement circuit and a second temperature measurement circuit. The first temperature measurement circuit is usually set inside the tip of the probe body to insert into the food and measure the temperature inside the food. The second temperature measurement circuit is usually set inside the handle. When the food temperature probe is inserted into the food, the handle is exposed outside the food and measures the ambient temperature around the food.

Existing food temperature probes often include a charging module, which includes a first charging wire and a second charging wire. Typically, the first charging wire is connected to the probe body and serves as the first charging electrode, and the second charging wire is connected to the handle or other metal components and serves as the second charging electrode. When the food temperature probe is placed on the probe box, the probe body serves as the first charging electrode, and the handle or other metal components serve as the second charging electrode and connect to the charging power source to start charging the battery of the temperature measurement circuit. Therefore, existing food temperature probes usually have at least four wires arranged on the handle, including the third wire and fourth wire of the second temperature measurement circuit, the second charging wire of the charging module, and the antenna. At least three metal wires are arranged around the antenna, which have adverse effects on the signal stability of the antenna. Besides that, the more wires there are, the higher the production cost and the greater the manufacturing difficulty. Furthermore, the wires inside the handle usually need to pass through the first transition connector (usually a high-temperature resistant and insulated ceramic part), and the ceramic part needs to be pre-perforated for the wires to pass through. Therefore, the more wires there are, the more perforations are set for the ceramic part, which not only increases the difficulty of the manufacturing process, but also deteriorates the stability and rigidity of the ceramic part with the increase of perforations. Therefore, there is significant improvement in the existing four-line layout method, which needs to be further addressed and perfected.

SUMMARY

The purpose of the present disclosure is to provide a temperature measurement circuit structure and a temperature probe to address the shortcomings of the existing technologies mentioned above.

According to the embodiments of the present disclosure, a first aspect of the present disclosure provides a temperature measurement circuit structure, where the temperature measurement circuit structure is provided in a temperature probe and includes a PCBA board, a control chip, a first temperature measurement circuit, a second temperature measurement circuit, a battery, a charging module, and an antenna; where the temperature measurement circuit structure further includes a switching circuit, and the switching circuit is connected to the charging module;

the first temperature measurement circuit includes a first wire and a second wire, the first wire and the second wire are connected to the control chip through the PCBA board;

the second temperature measurement circuit includes a third wire and a fourth wire, the third wire and the fourth wire are connected to the control chip through the PCBA board;

the charging module includes a first charging wire, and the first charging wire is connected to the control chip through the PCBA board;

in a charging state, the switching circuit connects the third wire or the fourth wire to the charging module and serves as a second charging wire of the charging module;

in a non-charging state, the switching circuit disconnects the third wire or the fourth wire, which serves as the second charging wire, from the charging module.

In some embodiments of the present disclosure, the temperature probe includes a probe housing assembly, and the probe housing assembly includes a metal probe body, a metal handle housing, and a first transition connector; the first transition connector is provided between the metal probe body and the metal handle housing, and the first transition connector is non-conductive; the third wire, the fourth wire, and the antenna pass through the first transition connector.

In some embodiments of the present disclosure, the first temperature measurement circuit further includes a first temperature measurement sensor, and the first temperature measurement sensor is provided inside a tip of the metal probe body.

In some embodiments of the present disclosure, the first charging wire is connected to the metal probe body, and the metal probe body serves as a first charging electrode of the charging module.

In some embodiments of the present disclosure, the second temperature measurement circuit further includes a second temperature measurement sensor, and the second temperature measurement sensor is provided in the metal handle housing;

the probe housing assembly further includes a metal cover plate and a second transition connector, where the metal cover plate is provided at a tail end of the metal handle housing and the second transition connector is provided between the metal handle housing and the metal cover plate, and the second transition connector is non-conductive;

a second temperature sensor is electrically connected to the metal handle housing or the metal cover plate; the metal handle housing or the metal cover plate serves as a second charging electrode of the charging module.

In some embodiments of the present disclosure, the second temperature sensor includes a second thermocouple composed by the third wire and the fourth wire; the third wire and the fourth wire are connected at the metal cover plate; and the third wire and/or the fourth wire are electrically connected to the metal cover plate, or the third wire and the fourth wire are connected inside the metal handle housing and electrically connected to the metal cover plate through a fifth wire.

In some embodiments of the present disclosure, the second temperature sensor is a second thermistor, and the second thermistor is fixed on the metal cover plate; the third wire or the fourth wire is electrically connected to the metal cover plate through the fifth wire.

In some embodiments of the present disclosure, the temperature probe includes a probe housing assembly, where the probe housing assembly includes a metal probe body, a high-temperature insulated handle housing, and a metal cover plate; where the high-temperature insulated handle housing is non-conductive, and the metal probe body and the metal cover plate are connected to two ends of the high-temperature insulated handle housing;

the first charging wire is connected to the metal probe body and the metal probe body serves as a first charging electrode of the charging module; a second temperature sensor of the second temperature measurement circuit is electrically connected to the metal cover plate, and the metal cover plate serves as a second charging electrode of the charging module; the second temperature sensor includes a second thermocouple composed by the third wire and the fourth wire; the third wire and the fourth wire are connected at the metal cover plate and the third wire and/or the fourth wire are electrically connected to the metal cover plate, or the third wire and the fourth wire are connected inside the high-temperature insulated handle housing and electrically connected to the metal cover plate through the fifth wire.

In some embodiments of the present disclosure, the switching circuit includes a field-effect transistor.

According to the embodiments of the present disclosure, a second aspect of the present disclosure provides a temperature probe including the temperature measurement circuit structure described above.

In some embodiments of the present disclosure, one end of the antenna is connected to the control chip through the PCBA board, and the other end of the antenna is connected to a metal handle housing.

Compared with the existing technology, the advantageous effect of the technical solution provided in the present application is that it adds a switching circuit, which uses one of the third wire or fourth wire of the second temperature measurement circuit as the second charging wire of the charging module in the charging state, thereby reducing one wire inside the handle. In the non-charging state, the switching circuit cuts off a connection between the third wire or the fourth wire and the charging module, so that the second temperature measurement circuit can maintain a normal operation.

By reducing one charging wire of the charging module, the metal wires arranged around the antenna are reduced, thereby reducing an environmental electromagnetic impact on antenna signal transmission and reception, minimizing signal interference caused by excessive wire connections in enclosed and narrow spaces; reducing the number of wires, reducing the manufacturing cost of temperature probes and further lowering the manufacturing difficulty; reducing the number of perforations on the first transition connector, reducing its production cost and enhancing its rigidity and firmness.

BRIEF DESCRIPTION OF DRAWINGS

In order to provide a clearer explanation of the embodiments of the present disclosure or the technical solutions in the prior art, a brief introduction will be given to the accompanying drawings required for the description of the embodiments or prior art. It is obvious that the accompanying drawings described below are only some embodiments of the present disclosure. For those skilled in the art, other drawings can be obtained based on these drawings without creative labor.

Numeral reference: 1—metal probe body; 2—metal handle housing; 3—first transition connector; 21—metal cover plate; 22—second transition connector; 4—PCBA board; 41—battery; 51—first temperature measurement sensor; 52—second temperature measurement sensor; 521—third wire; 522—fourth wire; 611—first charging wire; 612—second charging wire; 7—antenna.

DESCRIPTION OF EMBODIMENTS

In order to enable technical personnel in this field to better understand the technical solutions in the present application, the following will provide a clear and complete description of the technical solutions in the embodiments of the present application in combination with the accompanying drawings. Obviously, the described embodiments are only a part of the embodiments of the present application, not all of them. Based on the embodiments in the present application, all other embodiments obtained by those skilled in the art without creative work are within the protection scope of the present application.

Figure 2:
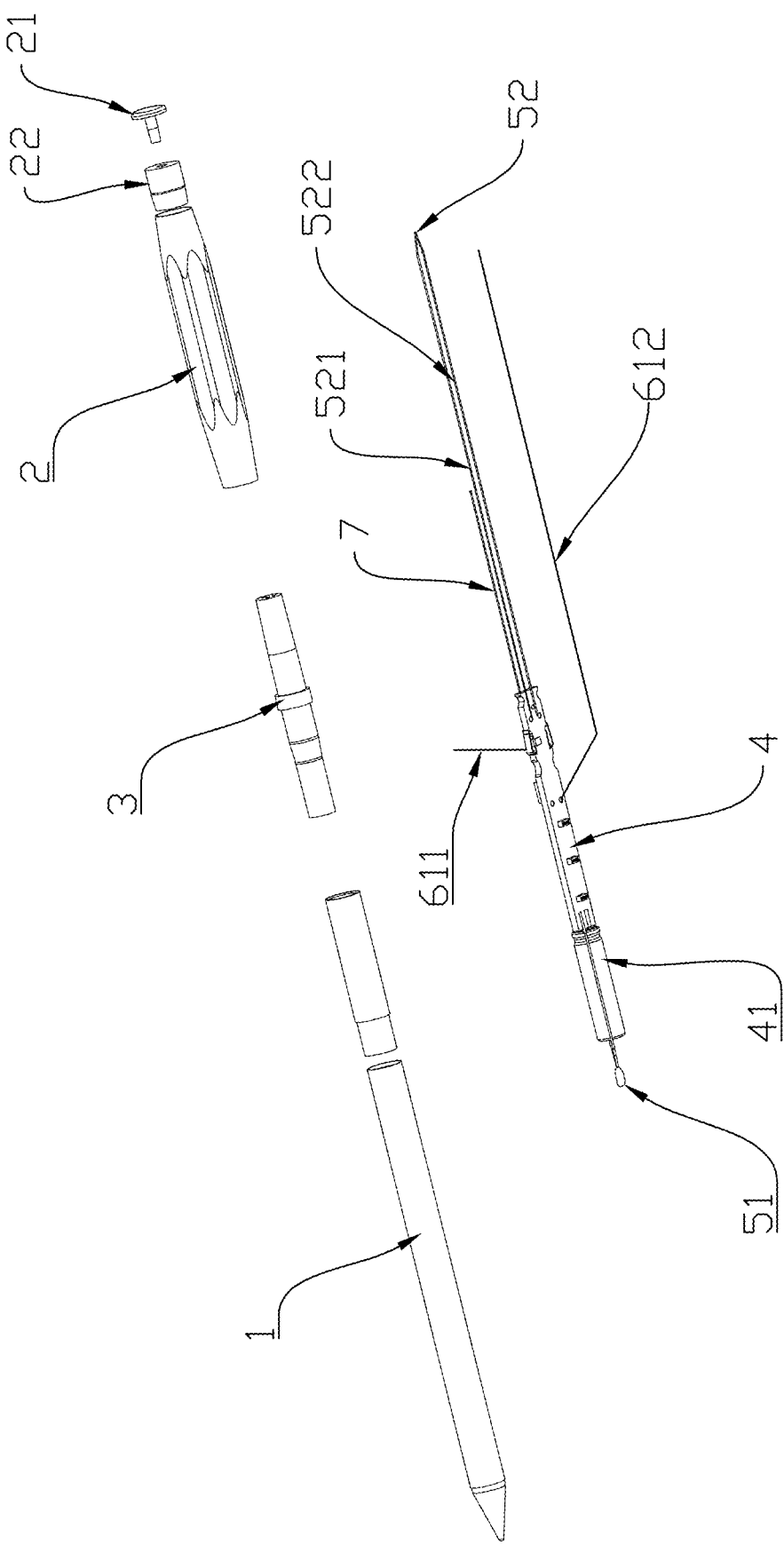
FIG. 2 is a schematic structural diagram of a temperature measurement circuit in the prior art.

As shown in FIG. 2, existing food temperature probes often include a charging module, and the charging module includes a first charging wire 611 and a second charging wire 612. Typically, the first charging wire 611 is connected to a probe body and serves as a first charging electrode of the probe body, and the second charging wire 612 is connected to a handle or other metal components and serves as a second charging electrode. When the food temperature probe is placed on a probe box, the probe body serves as the first charging electrode, and the handle or other metal components serve as the second charging electrode and connect to a charging power supply so as to start charging a battery 41 of the temperature measurement circuit. Therefore, the existing food temperature probes usually have at least four wires arranged on the handle, including a third wire 521 and a fourth wire 522 of a second temperature measurement circuit, and a second charging wire 612 of the charging module, as well as an antenna 7. The technical problems it faces include at least: firstly, at least three metal wires are arranged around the antenna 7, these metal wires have an adverse effect on signal stability of the antenna 7; secondly, the more wires there are, the higher production cost and greater the manufacturing difficulty; thirdly, wires inside the handle usually need to pass through a first transition connector 3 (usually a high-temperature resistant and insulated ceramic part), and the ceramic part needs to be pre-set with perforations for the wires to pass through. Therefore, the more wires there are, the more perforations the ceramic part needs to have. This not only increases the difficulty of the manufacturing process, but also deteriorates the stability and rigidity of the ceramic part with the increase of perforations.

Figure 1:
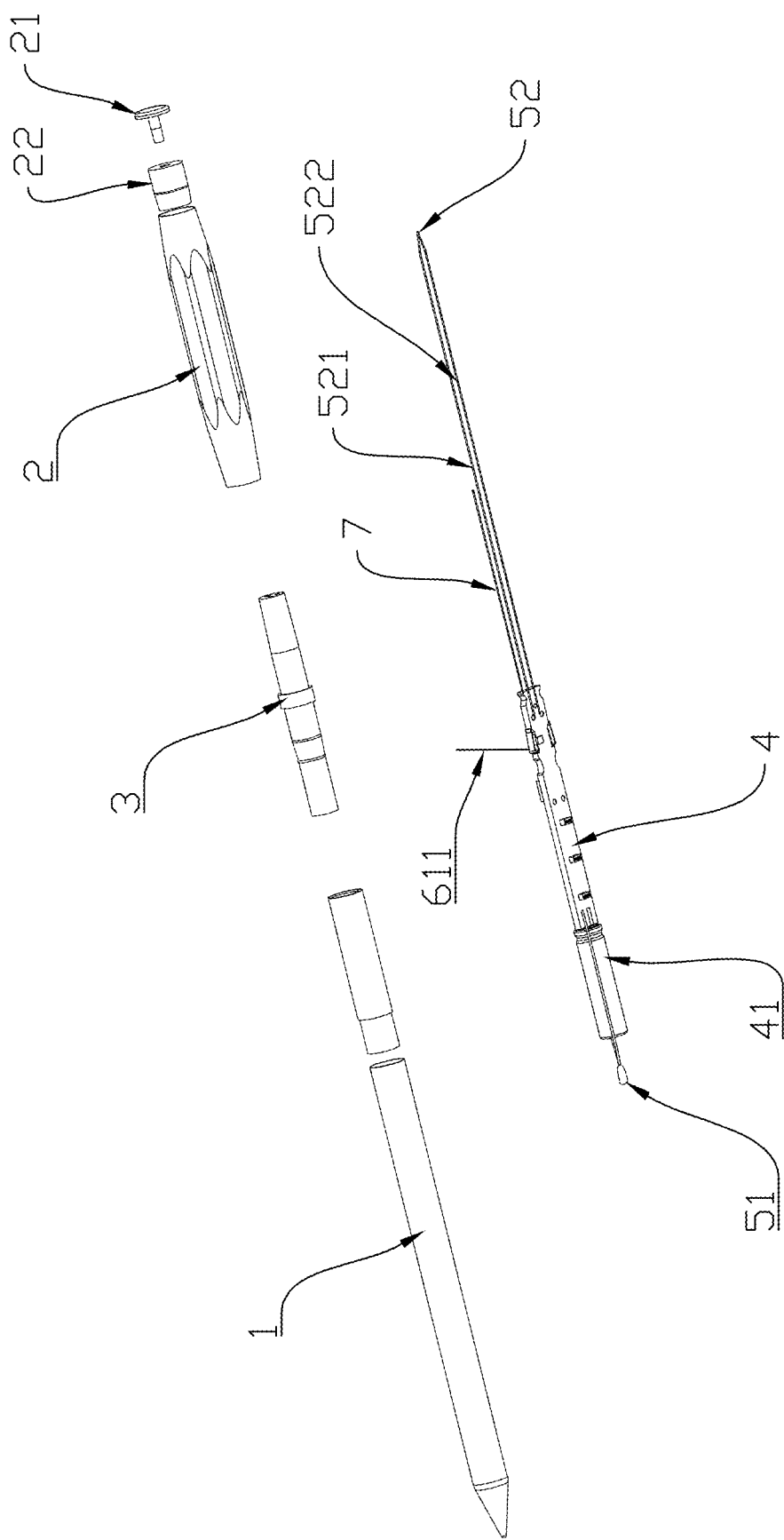
FIG. 1 is a schematic diagram of a temperature measurement circuit structure in an embodiment.

In order to solve the above technical problems, this embodiment provides a temperature measurement circuit structure, as shown in FIG. 1. The temperature measurement circuit structure not only includes an existing PCBA board 4, a control chip, a first temperature measurement circuit, a second temperature measurement circuit, a battery 41, and the antenna 7, but further includes a switching circuit. The charging module only includes a first charging wire 611 and does not have a second charging wire 612. The switching circuit is connected to the charging module and, in a charging state, the third wire 521 or the fourth wire 522 of the second temperature measurement circuit is connected to the charging module, and the third wire 521 or the fourth wire 522 serves as a second charging wire 612, thereby reducing the second charging wire 612 of the charging module in the existing technology.

In this embodiment, the switching circuit is added, which uses one of the third wire 521 or the fourth wire 522 of the second temperature measurement circuit as the second charging wire 612 of the charging module in the charging state, thereby reducing one metal wire inside the handle. In a non-charging state, the switching circuit cuts off a connection between the third wire 521 or the fourth wire 522 with the charging module to keep the second temperature measurement circuit in a normal working condition.

By reducing one charging wire of the charging module, the metal wires arranged around the antenna 7 have been reduced, thereby reducing environmental electromagnetic impact on the signal transmission and reception of the antenna 7, and minimizing the signal interference caused by excessive wire connections in enclosed and narrow spaces; reducing the number of wires, reducing manufacturing cost of temperature probes and further lowering the manufacturing difficulty; reducing the number of perforations on the first transition connector 3, reducing its production cost and enhancing its rigidity and firmness.

In an implementation mode, the temperature measurement circuit structure includes a PCBA board 4, a control chip, a first temperature measurement circuit, a second temperature measurement circuit, a battery 41, a charging module, and an antenna 7. The temperature measurement circuit structure further includes a switching circuit, and the switching circuit is connected to the charging module.

In an implementation mode, the first temperature measurement circuit includes a first wire and a second wire. The first wire and the second wire are connected to the control chip through the PCBA board 4. Usually, the first temperature measurement circuit is provided at a tip of a metal probe body 1 to measure temperature inside the food.

The second temperature measurement circuit includes a third wire 521 and a fourth wire 522. The third wire 521 and the fourth wire 522 are connected to the control chip through the PCBA board 4. The second temperature measurement circuit is provided in a metal handle housing 2. When measuring the temperature of food, the metal handle is exposed outside the food. The second temperature measurement circuit is configured to measure ambient temperature of the food.

The charging module includes a first charging wire 611, and the first charging wire 611 is connected to the control chip through the PCBA board 4. A difference from existing technology is that the charging module only includes the first charging wire 611.

In a charging state, the switching circuit connects the third wire 521 or the fourth wire 522 to the charging module and serves as a second charging wire 612 of the charging module. In a non-charging state, the switching circuit will disconnect the third wire 521 or the fourth wire 522, which serves as a second charging wire 612, from the charging module.

In an implementation mode, the temperature probe includes a probe housing assembly, and the probe housing assembly includes the metal probe body 1, the metal handle housing 2, and the first transition connector 3. The first transition connector 3 is provided between the metal probe body 1 and the metal handle housing 2, and the first transition connector 3 is non-conductive. The third wire 521, the fourth wire 522, and the antenna 7 pass through the first transition connector 3. The metal probe body 1 is connected to the first charging wire 611 and serves as a first charging electrode.

In an implementation mode, the metal probe body 1 can also be divided into two sections, a tip section and a main stainless-steel shell. The tip section and the main stainless-steel shell are connected by laser welding and achieve a sealed and reliable connection.

In an implementation mode, the first transition connector 3 is a ceramic component, which has high temperature resistance and insulation properties.

In an implementation mode, the probe housing assembly further includes a metal cover plate 21 and a second transition connector 22. The metal cover plate 21 is provided at a tail end of the metal handle housing 2, and the second transition connector 22 is provided between the metal handle housing 2 and the metal cover plate 21. The second transition connector 22 is non-conductive. The second temperature sensor 52 is electrically connected to the metal handle housing 2 or the metal cover plate 21, and the metal handle housing 2 or the metal cover plate 21 serves as a second charging electrode of the charging module.

In an implementation mode, the second charging electrode is the metal cover plate 21. Firstly, a distance between the metal cover plate 21 and the food is the farthest among all structures of the food temperature probe; secondly, the metal cover plate 21, as the second charging electrode, is also related to the position of the second temperature measurement circuit. The second temperature measurement circuit needs to respond quickly to the ambient temperature, and in traditional solutions, the ambient temperature is transmitted to the second temperature measurement circuit through media, including the handle and the air inside the handle. This results in a slow response time of the second temperature measurement circuit and inaccurate and durable temperature measurement results. In an implementation mode, the metal cover plate 21 serves as the second charging electrode, and in an implementation mode, the second temperature sensor 52 can be placed on the metal cover plate 21, so that the ambient temperature is transmitted to the second temperature measurement circuit only through the medium of the metal cover plate 21. The handle, as a whole structure, requires a certain thickness to ensure overall rigidity, while the metal cover plate 21 can be made thinner at the tail end so as to quickly respond to the ambient temperature and achieve higher measurement accuracy. In an implementation mode, the second temperature sensor is attached to the metal cover plate 21 instead of suspended inside the handle, which results in faster response speed and higher measurement accuracy.

Figure 3:
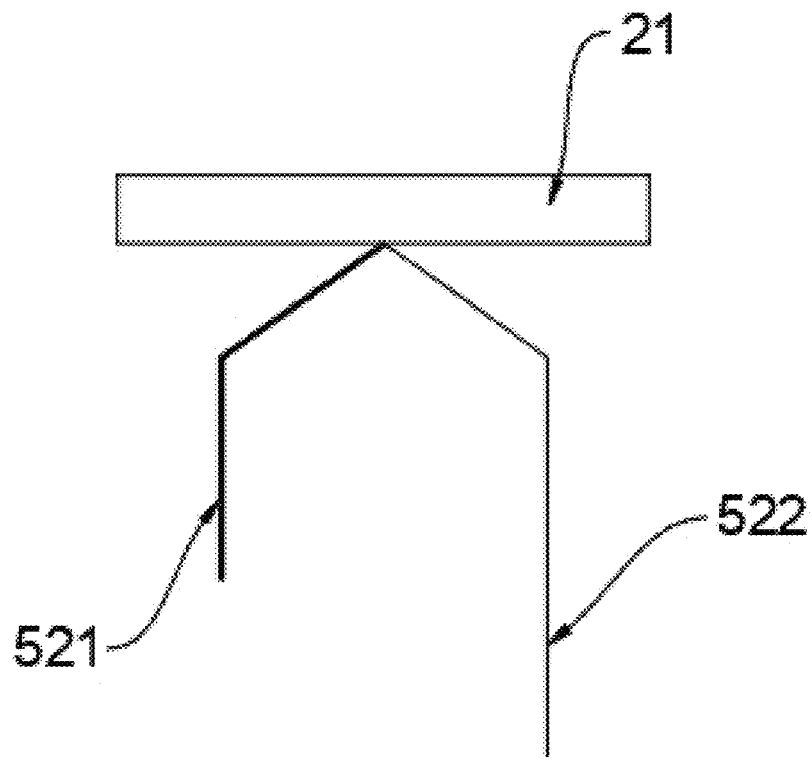
FIG. 3 is a schematic diagram of a second temperature sensor being a second thermocouple in an embodiment.
Figure 4:
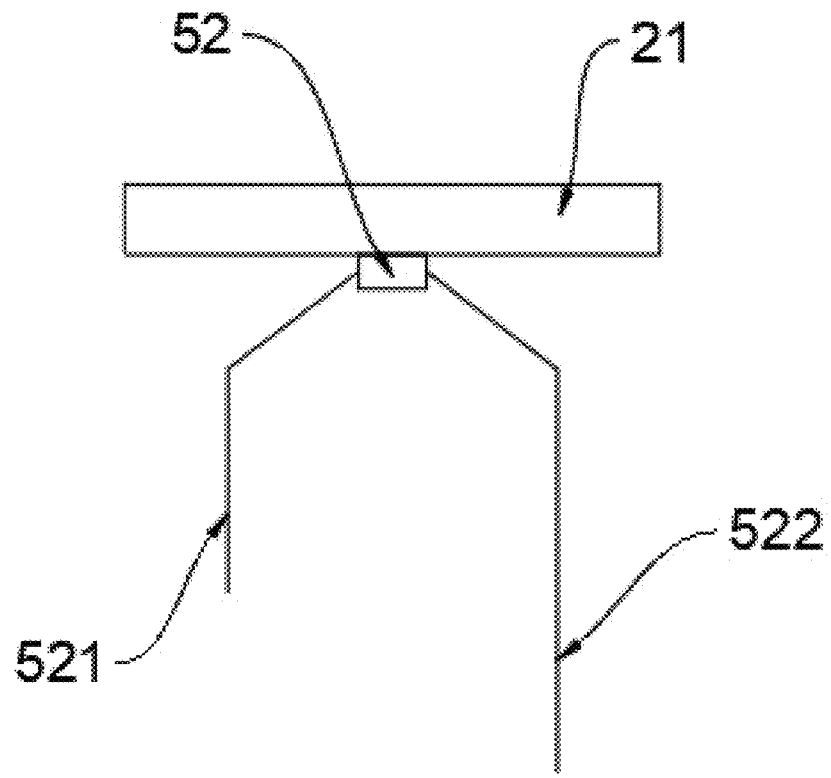
FIG. 4 is a schematic diagram of the second temperature sensor being a second thermistor in an embodiment.

As shown in FIGS. 3-4, this embodiment provides two types of second temperature sensors 52.

In an implementation mode, the second temperature sensor 52 is a thermocouple structure, the second temperature sensor 52 includes a second thermocouple composed by a third wire 521 and a fourth wire 522. The third wire 521 and the fourth wire 522 are connected at the metal cover plate 21, and the third wire 521 and/or the fourth wire 522 are electrically connected to the metal cover plate 21.

In an implementation mode, the second thermocouple is not directly connected to the metal cover plate 21, but is suspended in the metal handle housing 2 or suspended in a high-temperature insulated handle housing, and then is electrically connected to the metal cover plate through a fifth wire.

The structure of the thermocouple is simpler, and in this embodiment, the thermocouple is directly connected to the metal cover plate 21, which is not affected by the intermediate medium, with higher measurement accuracy and faster response speed.

In an implementation mode, the second temperature sensor 52 is a thermistor, and the thermistor is fixed on the metal cover plate 21. The third wire 521 or the fourth wire 522 is electrically connected to the metal cover plate 21 through the fifth wire. In this embodiment, the second thermistor can be fixed on the metal cover plate 21, but in order to ensure that the switching circuit can use the third wire 521 or the fourth wire 522 as the second charging wire 612 in the charging state, it is necessary to electrically connect the third wire 521 or the fourth wire 522 to the metal cover plate 21 through the fifth wire.

Similarly, a first temperature sensor 51 can also be a thermocouple structure or a thermistor structure.

In this embodiment, the handle uses a non-metallic high-temperature insulated handle housing, that is, the temperature probe includes a probe housing assembly, and the probe housing assembly includes the metal probe body 1, a high-temperature insulated handle housing, and the metal cover plate 21. The high-temperature insulated handle housing is non-conductive, and the metal probe body 1 and the metal cover plate 21 are connected to two ends of the high-temperature insulated handle housing.

The first charging wire 611 is connected to the metal probe body 1 and the metal probe body 1 serves as a first charging electrode of the charging module. A second temperature sensor 52 of the second temperature measurement circuit is electrically connected to the metal cover plate 21 and the metal cover plate 21 serves as a second charging electrode of the charging module. The second temperature sensor 52 includes a second thermocouple composed by a third wire 521 and a fourth wire 522. The third wire 521 and the fourth wire 522 are connected at the metal cover plate 21, and the third wire 521 and/or the fourth wire 522 are electrically connected to the metal cover plate 21, or the third wire 521 and the fourth wire 522 are connected inside the high-temperature insulated handle housing and electrically connected to the metal cover plate 21 through a fifth wire.

This embodiment provides a switching circuit, and the switching circuit includes a field-effect transistor.

In a charging state, the field-effect transistor is in a low-level conductive state, and a connection between the third wire 521 or the fourth wire 522 and the charging module is conductive. The third wire 521 or the fourth wire 522 serves as a second charging wire 612 of the charging module. In the non-charging state, the field-effect transistor is in a high-level disconnected state, and the switching circuit will cut off the third wire 521 or the fourth wire 522, which is used as the second charging wire 612, from the charging module.

It is obvious that, high level and low-level states of the field-effect transistor can be interchanged, and the conduction or disconnection between the third wire 521 or the fourth wire 522 and the charging module can be achieved through a simple circuit structure.

Obviously, other similar components or circuit structures also fall within the protection scope of the present disclosure.

This embodiment provides a temperature probe including any of the temperature measurement circuit structures mentioned above.

In an implementation mode, one end of the antenna 7 can be connected to the metal handle housing 2, thereby reducing the use of the handle housing as the antenna 7. Its signal transmission is not affected by the direction of the probe placement, and the signal transmission of the metal handle housing 2 as the antenna 7 is on the outer layer. The signal transmission is not affected by the housing components, nor is it interfered with by other sensor metal wires inside. The transmission distance is more stable and farther, and the antenna 7 can also be directly connected to the metal handle housing 2 after passing through the first transition connector 3. The antenna 7 may have small size, and it is less affected by interference from other sensor metal wires.

The various technical features of the above embodiments can be combined arbitrarily. In order to render the description concise, not all possible combinations of the various technical features in the above embodiments have been described. However, as long as there is no contradiction in the combination of these technical features, they should be considered within the scope of this specification. The above embodiments only express several embodiments of the present application, and their descriptions are more specific and detailed, but should not be understood as limiting the scope of the present application. It should be pointed out that for those skilled in the art, several modifications and improvements can be made without departing from the concept of the present application, which are within the protection scope of the present application.

It should be noted that when a component is referred to as "fixed" or "provided" on another component, it can be directly or indirectly provided on another component; when a component is referred to as "connected" to another component, it can be directly or indirectly connected to another component. It should be understood that terms "length", "width", "up", "down", "front", "back", "left", "right", "vertical", "horizontal", "top", "bottom", "inside", "outside" and other directional or positional relationships indicated are based on the directional or positional relationships shown in the accompanying drawings, and are only for a convenience of describing and simplifying the present application, and do not indicate or imply that the device or component referred to must have a specific orientation, be constructed and operated in a specific orientation, and therefore cannot be understood as a limitation on the present application.

In addition, terms "first" and "second" are only used for descriptive purposes and cannot be understood as indicating or implying relative importance or implying the number of technical features indicated. Thus, the features limited to "first" and "second" may explicitly or implicitly include one or more of these features. In the description of the present application, the meanings of "multiple" and "a plurality of" refer to two or more, unless otherwise specified.

Note that the structure, proportion, size, etc. shown in the accompanying drawings of this specification are only for the purpose of cooperating with the content disclosed in the specification, for the understanding and reading of those familiar with this technology and are not intended to limit the conditions that can be implemented in the present application. Therefore, they do not have substantive technical significance. Any modification of the structure, change in proportion relationship, or adjustment of size should still fall within the scope of the technical content disclosed in the present application without affecting the efficacy and purpose that can be achieved.

What is claimed is:

1. A temperature measurement circuit structure, wherein the temperature measurement circuit structure is provided in a temperature probe and comprises a PCBA board, a control chip, a first temperature measurement circuit, a second temperature measurement circuit, a battery, a charging module, and an antenna,
   wherein the temperature measurement circuit structure further comprises a switching circuit, and the switching circuit is connected to the charging module;
   the first temperature circuit comprises a first wire and a second wire, the first wire and the seco re are connected to the control chip through the PCBA board;
   the second temperature measurement circuit comprises a third wire and a fourth wire, the third wire and the fourth wire are connected to the control chip through the PCBA board;
   the charging module comprises a first charging wire, and the first charging wire is connected to the control chip through the PCBA board;
   in a charging state, the switching circuit connects the third wire or the fourth wire to the charging module and serves as a second charging wire of the charging module;
   in a non-charging state, the switching circuit disconnects the third wire or the fourth wire, which serves as the second charging wire, from the charging module, so that the second temperature measurement circuit maintains a normal operation.

2. The temperature measurement circuit structure according to claim 1, wherein the temperature probe comprises a probe housing assembly, and the probe housing assembly comprises a metal probe body, a metal handle housing, and a first transition connector;
   the first transition connector is provided between the metal probe body and the metal handle housing, and the first transition connector is non-conductive;
   the third wire, the fourth wire, and the antenna pass through the first transition connector.

3. The temperature measurement circuit structure according to claim 2, wherein the first temperature measurement circuit further comprises a first temperature measurement sensor, and the first temperature measurement sensor is provided inside a tip of the metal probe body.

4. The temperature measurement circuit structure according to claim 2, wherein the first charging wire is connected to the metal probe body, and the metal probe body serves as a first charging electrode of the charging module.

5. The temperature it circuit structure according to claim 4, wherein the second temperature measurement circuit further comprises a second temperature measurement sensor, and the second temperature measurement sensor is provided in the metal handle housing;
   the probe housing assembly further comprises a metal cover plate and a second transition connector, wherein the metal cover plate is provided at a tail end of the metal handle housing and the second transition connector is provided between the metal handle housing and the metal cover plate, and the second transition connector is non-conductive;
   a second temperature sensor is electrically connected to the metal handle housing or the metal cover plate;
   the metal handle housing or the metal cover plate serves as a second charging electrode of the charging module.

6. The temperature measurement circuit structure according to claim 5, wherein the second temperature sensor comprises a second thermocouple composed by the third wire and the fourth wire;
   the third wire and the fourth wire are connected at the metal cover plate; and the third wire and/or the fourth wire are electrically connected to the metal cover plate, or
   the third wire and the fourth wire are connected inside the metal handle housing and electrically connected to the metal cover plate through a fifth wire.

7. The temperature measurement circuit structure according to claim 5, wherein the second temperature sensor is a second thermistor, and the second thermistor is fixed on the metal cover plate;
   the third wire or the fourth wire is electrically connected to the metal cover plate through a fifth wire.

8. The temperature measurement circuit structure according to claim 1, wherein the temperature probe comprises a probe housing assembly, wherein the probe housing assembly comprises a metal probe body, a high-temperature insulated handle housing, and a metal cover plate,
   wherein the high-temperature insulated handle housing is non-conductive, and the metal probe body and the metal cover plate are connected to two ends of the high-temperature insulated handle housing;
   the first charging wire is connected to the metal probe body, and the metal probe body serves as a first charging electrode of the charging module;
   a second temperature sensor of the second temperature measurement circuit is electrically connected to the metal cover plate, and the metal cover plate serves as a second charging electrode of the charging module;
   the second temperature sensor comprises a second thermocouple composed by the third wire and the fourth wire;
   the third wire and the fourth wire are connected at the metal cover plate and the third wire and/or the fourth wire are electrically connected to the metal cover plate, or
   the third wire and the fourth wire are connected inside the high-temperature insulated handle housing and electrically connected to the metal cover plate through a fifth wire.

9. The temperature measurement circuit structure according to claim 1, wherein the switching circuit comprises a field-effect transistor.

10. A temperature probe comprising the temperature measurement circuit structure according to claim 1.

11. The temperature probe according to claim 10, wherein one end of the antenna is connected to the control chip through the PCBA board, and the other end of the antenna is connected to a metal handle housing.

\* \* \* \* \*